United States Patent

Jack et al.

[15] 3,689,524
[45] Sept. 5, 1972

[54] PHENETHYLAMINE DERIVATIVES

[72] Inventors: David Jack; David Hartley; Lawrence Henry Charles Lunts, all of London, England

[73] Assignee: Allen & Hansburys Limited, London, E. 2, England

[22] Filed: May 27, 1970

[21] Appl. No.: 41,053

[30] Foreign Application Priority Data

May 30, 1969 Great Britain..........27,407/69

[52] U.S. Cl........260/471 A, 260/326 N, 260/465 D, 260/473 S, 260/501.17, 260/519, 260/553 A, 260/553 E, 260/556 AR, 260/559 S, 260/570.8 R, 424/309, 424/310, 424/324
[51] Int. Cl..........C07c 101/12, C07c 101/42, C07c 101/72
[58] Field of Search..........................260/471 A, 519

[56] References Cited

FOREIGN PATENTS OR APPLICATIONS

43/3769 2/1968 Japan........................260/519
78,303 10/1954 Denmark...................260/519

OTHER PUBLICATIONS

Fieser et al., " Organic Chemistry," 3rd ed., 1956, page 600.

*Primary Examiner*—Lorraine A. Weinberger
*Assistant Examiner*—R. S. Weissberg
*Attorney*—Bacon and Thomas

[57] ABSTRACT

The present invention provides compounds of the general formula I and physiologically acceptable addition salts thereof:

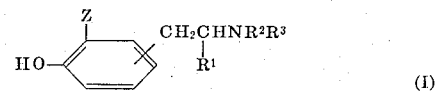

in which $R^1$ represents a hydrogen atom or a lower alkyl group;

$R^2$ represents a hydrogen atom or a benzyl or benzhydryl group;

$R^3$ represents a hydrogen atom or a lower alkyl group or $R^3$ represents an arylalkyl or aryloxyalkyl radical, which radicals may optionally be substituted by one or more alkoxy or hydroxyl groups;

Z represents a group of formula $-(CH_2)_nY$ in which $n$ has the value of 0, 1 or 2, and Y represents a hydroxyl radical (except when $n$ has the value O) or an alkoxycarbonyl group of the formula COOR where R represents a hydrogen atom or a lower alkyl group, or Y represents an amido group of formula $CONR^5R^6$ in which $R^5$ and $R^6$ are as defined below or a group of formula $-NR^4CONRR^6$, or $-NR^4SO_2R^7$ (in which $R^4$, $R^5$ and $R^6$, which may be the same or different, represent hydrogen atoms or lower alkyl groups and $R^7$ represents a lower alkyl group) except where $n$ = O and Y = $NR^4SO_2R^7$, $R^4$ is not hydrogen. Preferably at least one of the groups $R^1$, $R^2$ and $R^3$ is other than hydrogen, particularly when Z represents a —COOR group.

3 Claims, No Drawings

PHENETHYLAMINE DERIVATIVES

This invention relates to novel phenethylamine derivatives possessing useful biological activity and to compositions containing the same.

The present invention provides compounds of the general Formula I and physiologically acceptable addition salts thereof:

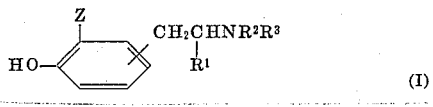

in which $R^1$ represents a hydrogen atom or a lower alkyl group;

$R^2$ represents a hydrogen atom or a benzyl or benzhydryl group;

$R^3$ represents a hydrogen atom or a lower alkyl group or $R^3$ represents an arylalkyl or aryloxyalkyl radical, which radicals may optionally be substituted by one or more alkoxy or hydroxyl groups;

Z represents a group of formula $-(CH_2)_nY$ in which $n$ has the value of 0, 1 or 2, and Y represents a hydroxyl radical (except when $n$ has the value 0) or an alkoxycarbonyl group of the formula COOR where R represents a hydrogen atom or a lower alkyl group, or Y represents an amido group of formula $CONR^5R^6$ in which $R^5$ and $R^6$ are as defined below or a group of formula $-NR^4CONR^5R^6$, or $-NR^4SO_2R^7$ (in which $R^4$, $R^5$ and $R^6$, which may be the same or different, represent hydrogen atoms or lower alkyl groups and $R^7$ represents a lower alkyl group) except where $n = 0$ and $Y = NR^4SO_2R^7$, $R^4$ is not hydrogen. Preferably at least one of the groups $R^1$, $R^2$ and $R^3$ is other than hydrogen, particularly when Z represents a —COOR group.

By the term "lower alkyl" as used above are meant alkyl radicals which contain from one to six carbon atoms, and which have a straight or branched chain.

As the compounds of Formula I may possess one or more asymmetric carbon atoms, the invention includes all the possible enantiomeric and diastereoisomeric forms of the compounds. The racemic mixtures may be resolved by conventional methods, for example by salt formation with an optically active acid, followed by fractional crystallization.

The compounds of the invention have useful actions on the cardiovascular system.

Thus, for example, the compound 5-{2-[(1-methyl-3-phenyl propyl)amino]ethyl} salicylamide hydrochloride,

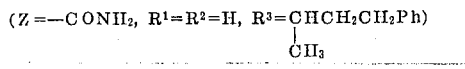

constriction of isolated artery preparations within a dose range of 1ng/ml to 1μg/ml. In addition these concentrations also prevent the subsequent constrictor activities of applied spasmogens, such as noradrenaline and 5-hydroxytryptamine. Its use is therefore indicated in the treatment of vascular headache (e.g., migraine).

In renal hypertensive dogs the compound lowered blood pressure by approximately 45 mm Hg, when administered intravenously at a dose of 1 mg/kg. The heart rate was not affected. The use of the drug in essential hypertension is therefore indicated. The compound 5-{2-[(1-methyl-3-phenylpropyl)amino]ethyl} salicylic acid, methyl ester hydrochloride at a dose of 1 mg/kg given intravenously lowered the blood pressure by approximately 40 mm Hg, and the heart rate by approximately 20 beats/minute in renal hypertensive dogs.

The compounds may be formulated for use in human or veterinary medicine for therapeutic or prophylactic purposes. The invention therefore includes within its scope pharmaceutical compositions comprising as active ingredients compounds of general Formula I or physiologically acceptable acid addition salts thereof. Preferred salts include the hydrochloride, sulphate, maleate, acetate, fumarate, lactate and citrate. Such compositions may be presented for use in a conventional manner with the aid of carriers or excipients and formulatory agents as required, and with or without supplementary medicinal agents. These compositions include, for instance, solid or liquid preparations for oral use, suppositories and injections. Oral administration is most convenient in the form of tablets which may be prepared according to conventional methods and may be coated if desired. Injections may be formulated with the aid of physiologically acceptable carriers and agents as solutions, suspensions, or as dry products for reconstitution before use. The active ingredient may be administered at dosages appropriate for the condition being treated, and for the age and weight of the patient, and may vary within a wide range.

Preferred compounds according to the invention are those the preparation of which is described in the Examples. The two compounds specifically mentioned above are particularly preferred.

The compounds of the present invention may be prepared by a number of processes.

In one process, the compounds of the invention in which $R^1$ is a hydrogen atom are prepared by reducing a nitrile derivative of Formula II below in which $Z^1$ represents a group Z or a group convertible thereto, for example by catalytic hydrogenation in acid solution, or by means of a complex metal hydride, for example lithium aluminum hydride. This reduction gives the compounds of Formula I in which $R^2$ and $R^3$ are both hydrogen. These primary amines of formula I may be converted into the compounds in which $R^3$ is not a hydrogen atom by condensation with a carbonyl compound, followed by reduction of the azomethine so formed with, for example, a complex metal hydride or hydrogen and a noble metal catalyst.

In a related process a carbonyl compound of the general formula III is condensed with an amine of formula $R^2R^3NH$, followed by reduction with for example, hydrogen and a noble metal catalyst, or sodium borohydride.

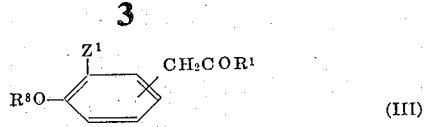

(III)

The radical $R^8$ represents hydrogen or a benzyl, lower alkyl, or acyl group. When $R^8$ is not a hydrogen atom it may be removed when desired by hydrolysis or by catalytic hydrogenation.

Where $R^2$ and $R^3$ in the amine $R^2R^3NH$ are both benzyl groups these steps lead to compounds of the Invention (I) where $R^2$ and $R^3$ are hydrogen atoms.

The carbonyl Compound III may be prepared by several processes, for example by the condensation of an aromatic aldehyde of Formula IV,

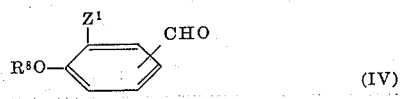

(IV)

with a nitro compound of formula $R^1CH_2NO_2$, in the presence of a base, to give a nitrostyrene compound of Formula V below, which is converted to the Compound III on treatment with iron in acid solution.

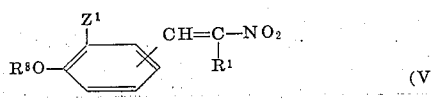

(V)

The compound of Formula V may also be reduced directly with, for example, lithium aluminum hydride or a noble metal catalyst and hydrogen in acid solution followed, if necessary, by conversion of the group —$OR^8$ to —OH, to give a compound of the invention.

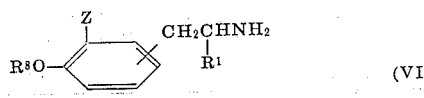

(VI)

Compounds of the invention where $R^3$ is not hydrogen can be obtained from compounds of Formula VI by reductive alkylation with a suitable aldehyde or ketone.

The compounds of the invention in which Z is the group —$(CH_2)_nNR^4COR^5$ may be prepared by acylating an amine of Formula VII below ($R^8$ = benzyl, hydrogen or lower alkyl, and $R^2$ and $R^3$ are not H) by conventional procedures, with a functional derivative of a carboxylic acid of formula $R^5COOH$, for example the acid chloride, acid anhydride, or alkyl ester. The protecting group(s) may then be removed by catalytic hydrogenolysis and/or hydrolysis with, for example hydrogen iodide or hydrobromic acid.

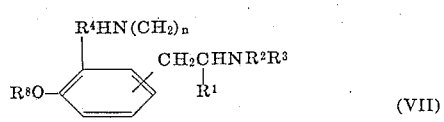

(VII)

Similarly, reaction of the amine VII ($R^2$ and $R^3$ do not represent hydrogen) with a sulphonyl chloride of formula $R^7SO_2Cl$ and removal of any protecting groups gives the compounds of the invention in which Z is a group of formula —$(CH_2)_nNR^4SO_2R^7$, or with a carbamoyl chloride $R^5R^6NCOCl$ gives the compounds of the invention in which Z is a group of formula —$(CH_2)_nNR^4CONR^5R^6$.

The compound of the invention in which Z is the group —$(CH_2)_nNR^4CONR^5R^6$ where one or both of $R^5$ and $R^6$ represent hydrogen may also be prepared by acylation of the amine of Formula VII, $R^2$ and $R^3$ do not represent hydrogen with cyanic acid derivatives and removal of protecting groups. For example, alkyl cyanates of formula $R^5NCO$ give the compounds of the invention in which $R^6$ is hydrogen, and alkali metal salts of cyanic acid give the compounds in which both $R^5$ and $R^6$ are hydrogen.

The amines of Formula VII in which $n = 1$ or 2 may be prepared from an alkoxycarbonyl derivative of Formula VIII below in which Alk is lower alkyl and in which A represents the side chain —$CHR^1NR^2R^3$, or a group convertible thereto by the methods given above, and $m$ is 0 or 1. This alkoxycarbonyl derivative reacts with ammonia to give the corresponding amide of Formula IX, below which is reduced with lithium aluminum hydride.

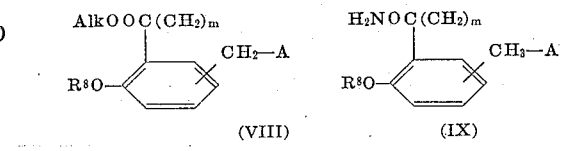

(VIII)         (IX)

The amines of Formula VII ($n = 1$) may also be obtained by reacting a compound of Formula X below with formaldehyde and hydrogen chloride, optionally in the presence of zinc chloride as a catalyst, to give the chloromethyl Compound XI below, followed by reaction with an amine $R^4NH_2$, and if necessary conversion of the group A. Compounds of Formula VII ($n = 1$) where $R^4 = H$ can be obtained from the chloromethyl Compound XI by condensation with potassium phthalimide followed by removal of the phthaloyl

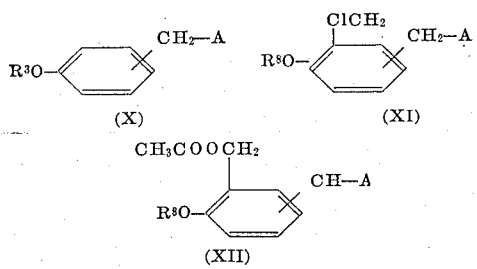

(X)      (XI)

(XII)

protecting group, for example with hydrazine.

Compounds of the invention in which Z is —$CH_2NR^4SO_2R^7$ ($R^4 = H$) may also be prepared from Compound XI by reaction with an alkali metal salt of an alkylsulfonamide $R^7SO_2NHR^4$. For derivatives where $R^4 = H$ the sodium salt of an acylsulfonamide $R^7SO_2NHAc$ may be used, and the acyl and other protecting groups subsequently removed by hydrolysis.

The compounds of Formula I in which Z represents a hydroxyalkyl radical of formula —$(CH_2)_n$ OH $n = 1$ or 2 may be prepared from the alkoxycarbonyl derivative of Formula VIII above by reduction with lithium aluminum hydride and removal of protecting groups. The hydroxymethyl derivatives may also be obtained from the chloromethyl compounds of Formula XI above by dissolving these in sodium acetate to give the corresponding acetoxy Compound XII, followed by hydrolysis with dilute acid or alkali, or by reduction with for example lithium aluminum hydride.

It will of course be understood that the reactions used for obtaining the different radicals represented by Z may also be carried out at any convenient stage in the synthesis of the compounds of the invention from the starting materials of Formula II, III, IV or V.

The following examples illustrate the invention.

EXAMPLE 1

5-[2-(Benzylamino)ethyl]saligenin acetate (salt)

i. A solution of 5-(2-aminoethyl)salicylic acid methyl ester hydrochloride (3.6 g) in ethanol (150 ml) containing sodium hydroxide (0.62 g) was stirred with benzaldehyde (1.96 g) for 1 hour at 0° C. Sodium borohydride (0.6 g) was added portionwise over 30 minutes and after a further hour the solution was evaporated. The oily residue was treated with 2N hydrochloric acid and ether and filtered. The resulting white solid was washed with hydrochloric acid and ethyl acetate and dried to give 5-[2-(benzylamino)-ethyl]salicylic acid methyl ester hydrochloride (3.85 g), m.p. 204°, raised to m.p. 212° when crystallized from methanol-ethyl acetate.

ii. The basic ester (3.0 g) liberated from the above hydrochloride was added in dry tetrahydrofuran (75 ml) dropwise to a suspension of lithium aluminum hydride (0.75 g) in dry tetrahydrofuran (50 ml). After being stirred for 15 minutes the mixture was treated dropwise with water (2 ml) in tetrahydrofuran (5 ml) filtered and the filtrate was acidified with 2N hydrochloric acid to pH 3. When concentrated the solution deposited a hydrochloride as a white solid. This was neutralized with aqueous sodium bicarbonate and extracted into ethyl acetate to which was added acetic acid (0.3 g) and ether. After 15 hours at 0° the acetate salt precipitated as white crystals, m.p. 117°, which crystallized from acetone. Yield: 75 percent

EXAMPLE 2

5-(2-Aminoethyl)saligenin

5-[2-(Benzylamino)ethyl]saligenin (3.9 g) in methanol (20 ml) and triethylamine (2 g) was added to pre-reduced 10 percent palladium-charcoal (1 g) in water (20 ml) and the mixture was reduced by hydrogen at room temperature and pressure.

When hydrogenation was complete, catalyst and solvents were removed to leave the primary amine which, when triturated with ethyl acetate, gave white crystals, m.p. 150°. Yield: 79 percent

EXAMPLE 3

5-[2-(α-Methyl-3,4,5-trimethoxyphenethyl)amino]

Ethyl Saligenin Acetate (Salt)

This was prepared in 64 percent yield from the corresponding ester by a method similar to that of Example 1. The compound was a white solid, m.p. 149°–153°

The ester from which it was derived was prepared as described in Example 1 (i) by reductive alkylation using 1-(3,4,5-trimethoxyphenyl)-2-propanone and catalytic hydrogen (in place of sodium borohydride).

EXAMPLE 4

5-[2-(Benzylamino)propyl]saligenin acetate (salt)

i. A solution of p-[2-(benzylamino)propyl]phenol (36 g) in glacial acetic acid (2.5 liters concentrated hydrochloric acid (75 ml) and 36 percent aqueous formaldehyde (15 ml) was saturated with dry hydrogen chloride and allowed to stand for 7 days at room temperature. When evaporated to dryness the solution gave a residue which was washed with chloroform (250 ml) and dried, to give 4-[2-(benzylamino)-propyl]-α-chloro-o-cresol hydrochloride, m.p. 190°–192°. Yield: 60 percent ii. Anhydrous sodium acetate (18 g) was added to the above amine (26.4 g) in acetic acid (2.2 liters and the solution was stirred at 50° for 5 hours and kept at room temperature overnight. The mixture was evaporated to dryness, washed with water and filtered to give 5-[2-(benzylamino)propyl]-saligenin, monoacetate, acetate (salt), m.p. 131°. Yield: 60 percent iii. The above salt (5 g) in warm dry tetrahydrofuran (500 ml) was added to a suspension of lithium aluminum hydride (5 g) in tetrahydrofuran (250 ml). After 30 minutes wet tetrahydrofuran was added to decompose the complex, and the mixture was evaporated, acidified with dilute hydrochloric acid and neutralized to pH 8 with solid sodium bicarbonate. Chloroform (500 ml) was added, solids were removed by filtration, and the water was separated and re-extracted with chloroform. The combined chloroform solutions were dried ($Na_2SO_4$) and evaporated to give the base as a yellow gum. By treating this in ethyl acetate with acetic acid (0.5 ml) the acetate salt (1.9 g) precipitated. Recrystallization from ethyl acetate gave crystals, m.p. 122°.

EXAMPLE 5

5-(2-Aminopropyl)saligenin acetate (salt)

This was prepared from the product of Example 4 by the method of Example 2. The product crystallized from ethanol-ether, m.p. 148°. Yield: 67 percent

EXAMPLE 6

4-(2-Aminoethyl)saligenin acetate (salt)

a. α-Cyano-2,4-cresotic acid, methyl ester

A solution of potassium cyanide (10 g) in water was added to a solution of α-bromo-2,4-cresotic acid, methyl ester, acetate"G. Regnier, R. Canevari and J.C. Le Douarec, Bull. Chem. Soc. France, 1966, 2821. (28.7 g) in dioxan (200 ml). After 2 hours at the reflux the mixture was concentrated and poured into water. The product was extracted into ether which was dried ($MgSO_4$) and evaporated to give the cyano ester (6.7 g) m.p. 87°–90°, which recrystallized from ether as colorless crystals, m.p. 101°.

b. 4-(2-Aminoethyl)salicylic acid methyl ester, hydrochloride.

A solution of the above cyano ester (5.73 g) in methanol (100 ml) was reduced by hydrogen in presence of platinum oxide (0.5 g) in ethanol (50 ml) and saturated methanolic hydrogen chloride (16 ml). The amine hydrochloride (5.5 g) was obtained as a white crystalline solid m.p. 209° when catalyst and solvent were removed.

c. 4-[2-(Benzylamino)ethyl]salicylic acid methyl ester hydrochloride

This was prepared from the above amine hydrochloride by the method described in Example 1 (i). The compound was obtained in 60 percent yield and crystallized from methanol-ethyl acetate as colorless crystals, m.p. 230°.

d. 4-[2-(Benzylamino)ethyl]saligenin

Reduction of the ester above, as described in Example 1 (ii) gave the saligenin base which crystallized from ether-cyclohexane as colorless microneedles, m.p. 82°.

e. 4-(2-Aminoethyl)saligenin acetate (salt)

Catalytic hydrogenation of the benzyl derivative above by the method of Example 2 gave a base which was converted to its acetate salt, m.p. 158.5°–159.5°.

EXAMPLE 7

4-{2-[(1,1-Diphenylmethyl)amino]ethyl}saligenin a. {4- 2-[(1,1-Diphenylmethyl)amino]ethyl} salicylic acid methyl ester hydrochloride A mixture of 4-(2-aminoethyl)salicylic acid methyl ester (7.0 g) and benzophenone (14 g) was heated at 170° for 1 hour, cooled and dissolved in ethanol (50 ml). Sodium borohydride (2 g) was added and the solution was stirred at room temperature for 1 hour and evaporated. The residue was treated with excess dilute hydrochloric acid, and the oily precipitate was extracted into chloroform. The dried ($MgSO_4$) solution was evaporated to a residue which on trituration with ether yielded the hydrochloride (11 g), which crystallized from methanol-ethyl acetate as white crystals, m.p. 135°.

b. 4-{2-[(1,1-Diphenylmethyl)amino]ethyl} saligenin

Reduction of the above ester using lithium aluminum hydride as in Example 1 (ii) gave the saligenin (in 75 percent yield) which recrystallized from ether as colorless plates, m.p. 131°–132°.

EXAMPLE 8

[5-(2-Aminopropyl)salicyl]urea a. N,N-Dibenzyl-p-methoxy-α-methylphenethylamine

A mixture of N-benzyl-p-methoxy-α-methylphenethyl-amine[1] [1] E.H. Woodruff, J. P. Lambooy and W.E. Burt, J. Am. Chem. Soc., 1940, 62, 922. (217 g), potassium carbonate (120 g), sodium iodide (30 g) and benzyl chloride (91 ml) in ethyl methyl ketone (500 ml) was stirred and refluxed for 4 hours. The cooled reaction mixture was filtered, and the filtrate evaporated to dryness to leave an oil, which distilled to give the amine (119 g) as a lemon-colored oil b.p. 185°–195°/0.3 mm. A portion was identified as a sulphate, m.p. 182°–183°.

b. N,N-Dibenzyl-3-(chloromethyl)-4-methoxy-α-methylphenethylamine hydrochloride

A solution of the above amine (5.0 g), concentrated hydrochloric acid (7.5 ml), formaldehyde solution (1.5 ml) and glacial acetic acid (50 ml) was saturated with hydrogen chloride. After 10 days at room temperature the deep red solution was evaporated under reduced pressure to leave an oil that, on standing in contact with dry ether, gave the hydrochloride, m.p. 126°. Recrystallization from ethyl acetate afforded white microcrystals (2.75 g) m.p. 131°.

c. N-{5[2-(Dibenzylamino)propyl]-2-methoxybenzyl}phthalimide, hydrochloride

The above hydrochloride (1.1 g) was converted into its base and heated on the steam bath for 3 hours with potassium phthalimide (0.45 g) in N,N-dimethylformamide (25 ml). The concentrated mixture was treated with water and extracted with ethyl acetate. The ethyl acetate extracts were washed with water, dried ($Na_2SO_4$) and treated with ethereal hydrogen chloride to give the phthalimido hydrochloride (1.0 g) m.p. 135°–137°.

d. α-Amino-4-[2-(dibenzylamino)propyl]-o-cresol, acetate (salt)

A solution of hydrazine hydrate (0.5 ml) and the above phthalimide hydrochloride (1.0 g) in methanol was heated under reflux for 2 hours, and evaporated to dryness. Dilute hydrochloric acid was added and, after removal of precipitated phthalhydrazide, was neutralized with sodium bicarbonate. The base was extracted by ether which was dried ($Na_2SO_4$) and evaporated to give the diamine as a yellow oil.

The base was demethylated by refluxing in aqueous hydrobromic acid (48 percent; 25 ml) for 4 hours. The acidic mixture was neutralized with sodium bicarbonate to yield a buff solid (0.5 g). Treatment of this base with acetic acid in ethyl acetate converted it to an acetate salt m.p. 132°–135°, raised to 139°–141° on recrystallization from ethyl acetate.

e. {5-[2-(Dibenzylamino)propyl]salicyl}urea

A mixture of the acetate salt (0.5 g), above, potassium cyanate (0.4 g) and glacial acetic acid (0.3 ml) in ethanol (10 ml) was heated under reflux for 30 minutes, evaporated and neutralized with sodium carbonate. The mixture was extracted several times with ether, which was dried ($Na_2SO_4$) and evaporated to yield the urea as a white solid (0.5 g) m.p. 140°–150°, which recrystallized from aqueous acetone as white microcrystals, m.p. 154°–156°.

f. [5-(2-Aminopropyl)salicy]urea

Debenzylation of the above urea was carried out as described in Example 2, to afford the primary amine in 50 percent yield, as a white solid which crystallized from methanolethyl acetate as white microcrystals, m.p. 155° (decomp).

EXAMPLE 9

[5-(2-Aminoethyl)-2-hydroxyphenyl]urea hydrochloride a. 4-{[2-(1,1-Diphenylmethyl)amino]ethyl}phenol hydrochloride The Schiff's base of tyramine and benzophenone prepared from tyrosine as described by A.F. Al-Sayyab and A. Lawson, J. Chem. Soc., 1968, C, 406, was reduced by sodium borohydride in ethanol in a manner similar to that of Example 1 (i). The hydrochloride was obtained in 60% yield as colorless needles, m.p. 235°–238°, which could be recrystallized from methanol-isopropanol, m.p. 238°–239°.

b. 4-{[2-Benzyl-(1,1-diphenylmethyl)amino]ethyl} phenol, hydrochloride

The amine above was benzylated by the procedure described in Example 8 (a). The product was obtained in 88 percent yield as a cream solid m.p. 200°–201°, raised to 218°–220° when recrystallized from methanol.

c. 4-{[2-Benzyl-(1,1-diphenylmethyl)amino]ethyl}-2nitrophenyl, hydrochloride

A suspension of the hydrochloride (9.5 g) of Example 9 (b) in benzene (30 ml) was stirred with 8N nitric acid (25 ml) for 2 hours at room temperature. The mixture was diluted with water and filtered to give a solid which was treated with sodium bicarbonate solution and ether. The ethereal extract was dried, ($Na_2SO_4$) and evaporated to yield the nitrophenol as a red gum (9 g). A hydrochloride was obtained by the action of ethereal hydrogen chloride to give pale yellow crystals, m.p. 210°–212°.

d. 2-Amino-4-{[2-benzyl-(1,1-diphenylmethyl)amino]ethyl}phenol, dihydrochloride

A suspension of Raney nickel (approximately 25 g) in ethanol, was added to a solution of the nitrophenol base above (33 g) in ethanol (500 ml) and hydrazine hydrate (25 ml) was added dropwise with warming. The mixture was refluxed for 1 hour, filtered and evaporated to dryness. The residue was extracted into ether which was washed with water and dried ($Na_2SO_4$). Addition of ethereal hydrogen chloride precipitated the dihydrochloride (25 g) as a buff solid, which recrystallized from methanol-ethyl acetate to give a white solid, m.p. 185°–188° (decomp).

e. [{5-[2-Benzyl-(1,1-diphenylmethyl)amino]ethyl}-2-hydroxyphenyl]urea hydrochloride The base from the above dihydrochloride was converted into the urea by the method described in Example 8 (e) and gave a hydrochloride, m.p. 200°–201°.

f. [5-(2-Aminoethyl)-2-hydroxyphenyl]urea hydrochloride

Catalytic hydrogenolysis as in Example 2 afforded the primary amine hydrochloride which crystallized from methanol-ethyl acetate as cream needles, m.p. 185°–186°.

EXAMPLE 10

N-[5-(2-Aminopropyl)salicyl]methanesulfonamide a. N-{5-[2-(Dibenzylamino)propyl]salicyl} methanesulfonamide A solution of α-amino-4-[2-(dibenzylamino)propyl]o-cresol acetate salt (mentioned in Example 8 (d) ) (2g) in pyridine (35 ml) was treated with methanesulfonyl chloride (0.41 ml) in pyridine (10 ml) with ice-cooling. After 3 days at room temperature the mixture was evaporated and the residue basified with sodium bicarbonate and extracted into ethyl acetate. The dried extracts were evaporated to leave a yellow oil which was purified by chromatography down a silica column, eluting with ethyl acetate.

The desired base (0.8 g) was an oil [TLC (thin layer chromatography) ($SiO_2$—EtOAc):Rf 0.9] and was converted by treatment with hydrogen chloride in ether to a white hydrochloride, which crystallized from methanolethyl acetate as colorless microcrystals, m.p. 219°–220°.

b. N-[5-(2-Aminopropyl)salicyl]methanesulfonamide

Catalytic hydrogenolysis of the benzyl groups of the above base gave the primary amine as an oil, which was identified by its spectra and equivalent weight.

EXAMPLE 11

5'-{[(3-p-Methoxyphenyl-1-methylpropyl)amino] ethyl}-2'-hydroxyformanilide a. 5'-{[2-Benzyl-(1,1-diphenylmethyl)amino}ethyl-2'-hydroxyformanilide A solution of 2-amino-4-{[2-benzyl-(1,1-diphenyl-methyl)-amino]ethyl}phenol (mentioned in Example 9) (17 g) in ethyl formate (150 ml) was refluxed for 5 days and evaporated. The residue crystallized from ether-light petroleum (b.p. 40°–60) as pale yellow needles, m.p. 100°–104°.

b. 5'-{[( 3-p-Methoxyphenyl-1-methylpropyl)amino ]ethyl}-2'-hydroxy-formanilide

A solution of the above base (2.0 g) and 4-(p-methoxyphenyl)-2-butanone (1.0 g) in ethanol (50 ml) was hydrogenated in the presence of 10 percent palladium-charcoal (0.6 g) and 5 percent platinum-charcoal (0.6 g) catalysts. When reduction was complete the catalysts and solvent were removed to leave an oil. The base was separated by addition of acetate acid and removal of non-basic material by trituration with ether. The base was regenerated when the ether-insoluble acetate was neutralized with sodium bicarbonate solution and extracted into chloroform. The dried extract was evaporated and the formanilide crystallized from benzene as a white solid, m.p. 125°.

EXAMPLE 12

4-(2-Benzylaminopropyl)salicylic acid methyl ester, hydrochloride.

a. α,α-Dihydroxy-2,4-crestoic acid, methyl ester, triacetate.

A cold solution of chromium trioxide (18 g) in concentrated sulfuric acid (20 ml), acetic anhydride (100 ml) and glacial acetic acid (150 ml) was added slowly, over 2 hours, to a stirred solution of 2,4-crestoic acid, methyl ester, acetate (10 g) in acetic anhydride (200 ml). The temperature of the reaction mixture was kept between −10° to −15° during the addition and for a further 2 hours. Isopropanol was then added to remove excess oxidizing agent. The reaction mixture was concentrated to a small volume, quenched with ice-water, and extracted with chloroform. The chloroform was washed with 8 percent sodium bicarbonate solution, dried and evaporated to yield the ester triacetate, m.p. 96° (crystallizing from methanol) in 40 percent yield.

b. 4-(2-Nitropropenyl)-salicylic acid, methyl ester

Ammonium acetate (2.5 g) was added to a solution of α,α-dihydroxy-2,4-cresotic acid, methyl ester, triacetate (5.0 g) in nitro-ethane (200 ml) at 80°, and the reaction temperature raised to 100° for 4 hours. Concentration of the solution, and crystallization of the residue from methanol gave 4-(20nitropropenyl)salicyclic acid, methyl ester (m.p. 134°–5°) in 82 percent yield.

c. 4-Acetonyl-salicylic acid, methyl ester

Iron filings (10 g), ferric chloride (0.4 g) and concentrated hydrochloric acid (5 ml) were added to a solution of the above nitro-propene (4.9 g) in ethanol (75 ml) and water (175 ml) and the reactants heated under reflux for 6 hours. The reaction mixture was filtered and the filtrate concentrated under reduced pressure. The product was extracted into ethyl acetate, washed with 8 percent sodium bicarbonate, brine, and dried (MgSO$_4$). Concentration of the solution gave an orange solid, which distilled under reduced pressure to afford 4-acetonyl salicylic acid, methyl ester as a pale yellow solid m.p. 42°–44° in 85 percent yield.

d. 4-(2-Benzylaminopropyl)-salicylic acid, methyl ester, hydrochloride.

Triethylamine (1.2 g) and benzylamine (1.92 g) were added to a solution of 4-acetonyl-salicylic acid methyl ester (2.5 g) in methanol (100 ml) and the solution heated under reflux for 2 hours. The solution was hydrogenated, with pre-reduced Adams catalyst (0.35 g) until the theoretical quantity of hydrogen had been absorbed. Concentration of the solution, after removal of the catalyst, gave a yellow oil which was dissolved in ether. Addition of excess 2N hydrochloric acid gave the required product as a white solid. Crystallization from methanol-ethyl acetate afforded the hydrochloride as colorless needles m.p. 216°–218° in 70 percent yield.

EXAMPLE 13

5-{2-[(1-Methyl-3-phenylpropyl)amino]ethyl} salicylic acid, methyl ester hydrochloride

Treatment of 5-(2-aminoethyl)salicylic acid methyl ester (7.8 g) with 4-phenyl-2-butanone (6.7 g) and catalytic hydrogen as described in Example 3, gave the basic ester which was converted to its hydrochloride, m.p. 199°–200°.

Example 14

5-{2-[(1-methyl-3-phenylpropyl)amino]ethyl} salicylamide hydrochloride

The above ester (1.4 g) in methanol (50 ml) and ammonia solution (d. 0.880; 20 ml) were allowed to stand at room temperature for 5 days. The mixture was evaporated and the residue triturated with dilute hydrochloric acid to give the amide hydrochloride (1.0 g) m.p. 168°–169°.

The following are examples of intermediates that can be processed to compounds of the invention by methods analagous to those described above.

Example 15

3-(Aminomethyl)-N,N-dibenzyl-4-(benzyloxy)

phenethylamine dihydrochloride a. 5-(2-Aminoethyl)salicylamide hydrochloride

A solution of 5-(2-aminoethyl)salicylic acid methyl ester hydrochloride (described in Example 1) (1.9 g) in methanol (25 ml) and aqueous ammonia (d. 0.880; 25 ml) was allowed to stand at room temperature for 20 hours. Evaporation under reduced pressure gave a residue which with methanolic hydrogen chloride afforded the amine hydrochloride which crystallized from methanol-ether as a white solid, m.p. 262°–263°.

(b) 2-(Benzyloxy)-5-(2-dibenzylaminoethyl)benzamide hydrochloride

A mixture of the above primary amine hydrochloride (4.33 g) sodium carbonate (3.5 g) benzyl chloride (10 ml) and sodium iodide (12 g) in methyl ethyl ketone (100 ml) was stirred at the reflux for 72 hours, cooled and filtered. The filtrate was evaporated and treated with ethereal hydrogen chloride to precipitate the hydrochloride (8.8 g) as a low melting solid, which crystallized from methanol-ethyl acetate as colorless needles, m.p. 211°.

c. 3-(Aminomethyl)N,N-dibenzyl-4-(benzyloxy) phenethylamine dihydrochloride

A solution of the amide base, liberated by aqueous ammonia from the above hydrochloride (4.9 g) was added to a stirred warm suspension of lithium aluminum hydride (1.5 g) in tetrahydrofuran (20 ml). After being stirred at the reflux for 17 hours the cooled mixture was treated with water (5 ml), filtered and the filtrate evaporated. The oily residue was dissolved in ether and ethereal hydrogen chloride added, to precipitate the dihydrochloride as a white solid (3.7 g) m.p. 210°–212°. Recrystallization from methanol-ethyl acetate gave colorless needles, m.p. 220°–221°.

Example 16

N-{5-[2-(Dibenzylamino)ethyl]-2-methoxybenzyl}-N-methylmethanesulfonamide N-methylmethanesulfonamide a. N,N-Dibenzyl-3-(chloromethyl)-4-methoxyphenethylamine hydrochloride
Prepared from N,N-dibenzyl-p-methoxyphenethylamine hydrochloride by the method described in Example 8 (b), as colorless crystals from methanol-ethyl acetate, m.p. 190°–191°.

b. N-{5-[2-(Dibenzylamino)ethyl]-2-methoxybenzyl}-N-methylmethanesulfonamide.
The above hydrochloride (10 g) was basified and added to sodium N-methanesulfonamide in dimethylformamide (100 ml). After 1 hour at 100° the mixture was cooled and filtered to remove sodium chloride. The filtrate was evaporated, diluted with water and the product extracted with ether. When dried and evaporated the ethereal solution gave an oil (8.5 g) which crystallized from ethanol to afford the sulfonamide as colorless prisms, (5.3 g) m.p. 89°.

What is claimed is:

1. A compound selected from the group consisting of those of the formula

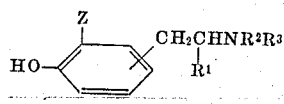

in which $R^1$ is a hydrogen atom or a lower alkyl group, $R^2$ is a hydrogen atom or a benzyl or benzhydryl group, $R^3$ is a hydrogen atom, a lower alkyl group, an arylalkyl or aryloxyalkyl radical, or an arylalkyl or aryloxyalkyl radical substituted by one or more alkoxy or hydroxyl groups, Z is a group of formula $-(CH_2)_nY$ in which $n$ has the value of 0, 1, or 2, and Y is $-COOR$ wherein:

R is a hydrogen atom or a lower alkyl group, and the physiologically acceptable addition salts thereof.

2. The compound of claim 1 which is 5-{2-[(1-Methyl-3-phenylpropyl)amino]ethyl}salicylic acid, methyl ester hydrochloride.

3. The compound of claim 1 which is 4-(2-Benzylaminopropyl)salicylic acid methyl ester, hydrochloride.

* * * * *